(12) United States Patent
Mackie

(10) Patent No.: US 12,731,156 B2
(45) Date of Patent: Sep. 8, 2026

(54) SYSTEM AND METHOD FOR INTEGRATING AND AUTOMATEDLY EXECUTING CUSTOMER SERVICE REPRESENTATIVE RESOURCE TOOLS

(71) Applicant: Verint Americas Inc., Alpharetta, GA (US)

(72) Inventor: Scott Mackie, Glasgow (GB)

(73) Assignee: Verint Americas Inc., Alpharetta, GA (US)

( * ) Notice: Subject to any disclaimer, the term of this patent is extended or adjusted under 35 U.S.C. 154(b) by 49 days.

(21) Appl. No.: 17/066,967

(22) Filed: Oct. 9, 2020

(65) Prior Publication Data

US 2021/0027305 A1 Jan. 28, 2021

Related U.S. Application Data

(63) Continuation-in-part of application No. 15/689,968, filed on Aug. 29, 2017, now abandoned.

(51) Int. Cl.

| | |
|---|---|
| ***G06Q 30/016*** | (2023.01) |
| ***G06F 16/93*** | (2019.01) |
| ***G06Q 30/02*** | (2023.01) |
| ***H04M 3/51*** | (2006.01) |

(52) U.S. Cl.
CPC ........... *G06Q 30/016* (2013.01); *G06F 16/93* (2019.01); *G06Q 30/02* (2013.01); *H04M 3/5175* (2013.01)

(58) Field of Classification Search
CPC ...... G06Q 30/01; G06Q 30/016; G06Q 30/02; G05B 2219/31404; G06F 16/93; H04M 3/5175
See application file for complete search history.

(56) References Cited

U.S. PATENT DOCUMENTS

| | | | | |
|---|---|---|---|---|
| 11,089,160 | B1 * | 8/2021 | Chen | G06Q 20/02 |
| 2005/0149418 | A1 | 7/2005 | Erbey | |
| 2010/0100490 | A1 * | 4/2010 | Lewis-Hawkins | G06Q 99/00 709/206 |
| 2010/0257012 | A1 | 10/2010 | Walker | |
| 2015/0358463 | A1 * | 12/2015 | O'Connor | G06Q 10/06313 379/88.02 |
| 2016/0269554 | A1 | 9/2016 | Cecchi | |
| 2017/0169438 | A1 | 6/2017 | Maynard | |
| 2017/0178145 | A1 * | 6/2017 | Adrian | G06F 16/9535 |

(Continued)

OTHER PUBLICATIONS

Pulitzer, Morgan "Speech-To-Text vs. Phonetics-Based Speech Analytics" Callfinder, Jul. 8, 2015; available at: https://www.mycallfinder.com/blog/speech-to-text-vs-phonetics/ (Year: 2015).*

(Continued)

*Primary Examiner* — Brendan S O'Shea
(74) *Attorney, Agent, or Firm* — Dinsmore & Shohl LLP

(57) ABSTRACT

The present invention is a system and method for organizing and integrating electronic customer service resources. A CEC system from a customer interaction receives data from a customer interaction and analyzes the data using a CAE incorporating a set of analytics rules before selecting a customer service module or a document from a document database based on the analysis. This data analysis and module or document selection repeats until all data received by the CEC system has been analyzed.

16 Claims, 4 Drawing Sheets

(56) References Cited

U.S. PATENT DOCUMENTS

Figure 1:
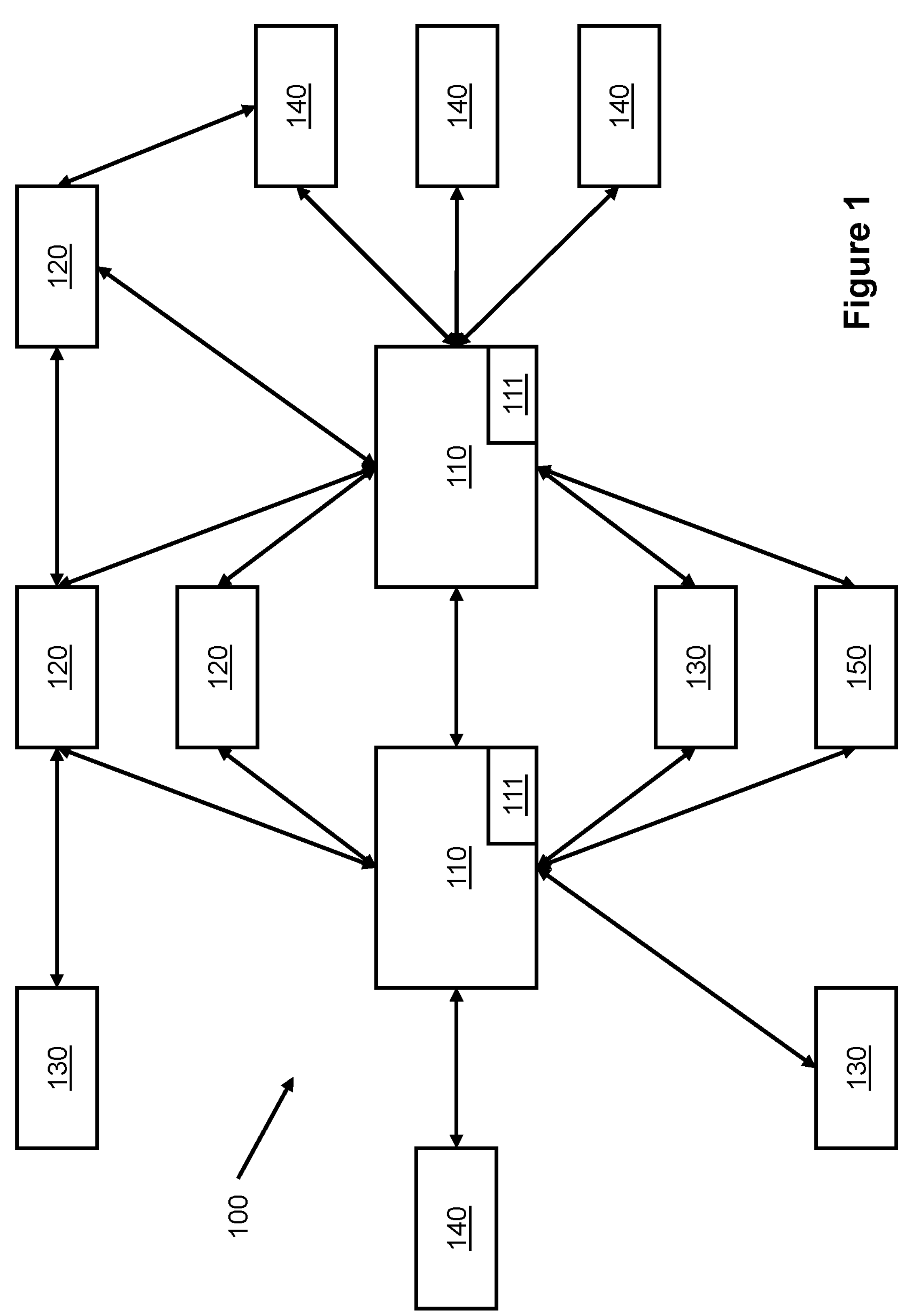

2018/0374029 A1* 12/2018 Henry .................... G06N 20/20
2019/0066116 A1 2/2019 Mackie

OTHER PUBLICATIONS

Hui, Siu Cheung, and G. Jha. "Data mining for customer service support." Information & Management 38.1 (2000): 1-13. (Year: 2000).*

International Search Report and Written Opinion for PCT/US2021/044743, issued on Nov. 23, 2021, from the European Patent Office.

International Preliminary Report on Patentability issued from the International Bureau of WIPO on Apr. 20, 2023, in connection with corresponding application PCT/US2021/044743.

* cited by examiner

SYSTEM AND METHOD FOR INTEGRATING AND AUTOMATEDLY EXECUTING CUSTOMER SERVICE REPRESENTATIVE RESOURCE TOOLS

FIELD

The present disclosure is directed to a method and system for computer analysis, specifically a method and system of integrating and automatedly executing electronic customer service representative resource tools for a user.

BACKGROUND

In a modern high-volume customer engagement center (CEC), it is often the case that a customer contact or communication requires a wide variety of communication protocols and resources. Computerized scripts provide predetermined optimized dialogue, desktop help screens provide information outside of normal channels, quality assurance computer systems provide real-time monitoring of the quality of a customer service representative's (CSR's) interaction with customers, software routing engines direct communications to appropriate CSRs, and so forth. Many CSRs become adept over time at utilizing every computer resource available to them to increase communication efficiency and customer satisfaction.

It is often the case, however, that when a new computer protocol or resource becomes available in a CEC computer system, the CSR may initially be unfamiliar with how to best integrate it into their customer service routine. A new computer protocol or resource may have a synergistic effect when used another computer protocol or resource but be useless or even detrimental without combination of the functions. Furthermore, a new CSR begins without any familiarity with the myriad computer resources available to them in the CEC computer system. As a result, they may use these resources inefficiently or completely miss vital computer protocol and resources. Moreover, CSRs with inherently poor communication skills require additional assistance when interacting with customers. Any of the above scenarios may lead to delay, missed or improper communications, decreased efficiency, or increased customer dissatisfaction.

For example, a CSR assigned to communicate with a high-value customer may mistakenly use an old communication protocol still stored in the CEC computer system as opposed to a new protocol designed to take into account the customer's new preferences. By the time the CSR realizes their mistake, the customer relationship may be damaged. In another example, a new CSR may receive an email because it was flagged for potential fraudulent activity, but not know how to access a routing log listing why the email was flagged. This CSR is required to undertake time-consuming research and review, potentially delaying a transaction that was not fraudulent, but had still triggered an automatic fraud review protocol. In another example, a CSR may need to access multiple computer resources for telephone contacts, delaying the call until they are able to locate and assemble all the resources they need. This may not be feasible for incoming calls with an impatient customer.

There is an unmet need in the art for a system and method capable of automatically providing computer-based communication resources to a CSR. There is a further unmet need in the art for a system and method capable of integrating and presenting these resources as needed in a complimentary fashion.

SUMMARY

Traditional CEC systems provide a CSR with a plurality of electronic customer service resources including customer service modules and document databases that assist the CSR in completing an interaction. However, these traditional CEC systems require the CSR to determine which electronic resource to use with no aid or suggestion from the CEC system. In order to efficiently and successfully assist customers, traditional CEC systems require the CSR to have extensive training and be proficient in using all electronic resources, including newly added electronic resources. An ideal CEC system will either recommend/suggest an optimized electronic resource for the CSR to use or will automatedly execute the electronic resource for the interaction. An exemplary embodiment of the present application is a method for organizing and integrating electronic customer service resources. A CEC system from a customer interaction receives data from a customer interaction and analyzes the data using a central analytics engine (CAE) incorporating a set of analytics rules before selecting at least one customer service module or at least one document from at least one document database based on the analysis. This data analysis and customer service module or document selection is repeated until all data received by the CEC system has been analyzed.

Another exemplary embodiment of the present application is a system for organizing and integrating electronic customer service resources. The system includes a processor and a non-transient computer readable medium programmed with computer readable code that upon execution by the processor causes the processor to execute the above-mentioned method for organizing and integrating electronic customer service resources.

Another exemplary embodiment of the present application is a non-transitory computer readable medium programmed with computer readable code that upon execution by a processor causes the processor to execute the above-mentioned method for organizing and integrating electronic customer service resources.

The objects and advantages will appear more fully from the following detailed description made in conjunction with the accompanying drawings.

BRIEF DESCRIPTION OF THE DRAWING(S)

FIG. 1 depicts an exemplary embodiment of a CEC system for organizing and integrating electronic customer service resources.

Figure 2A:
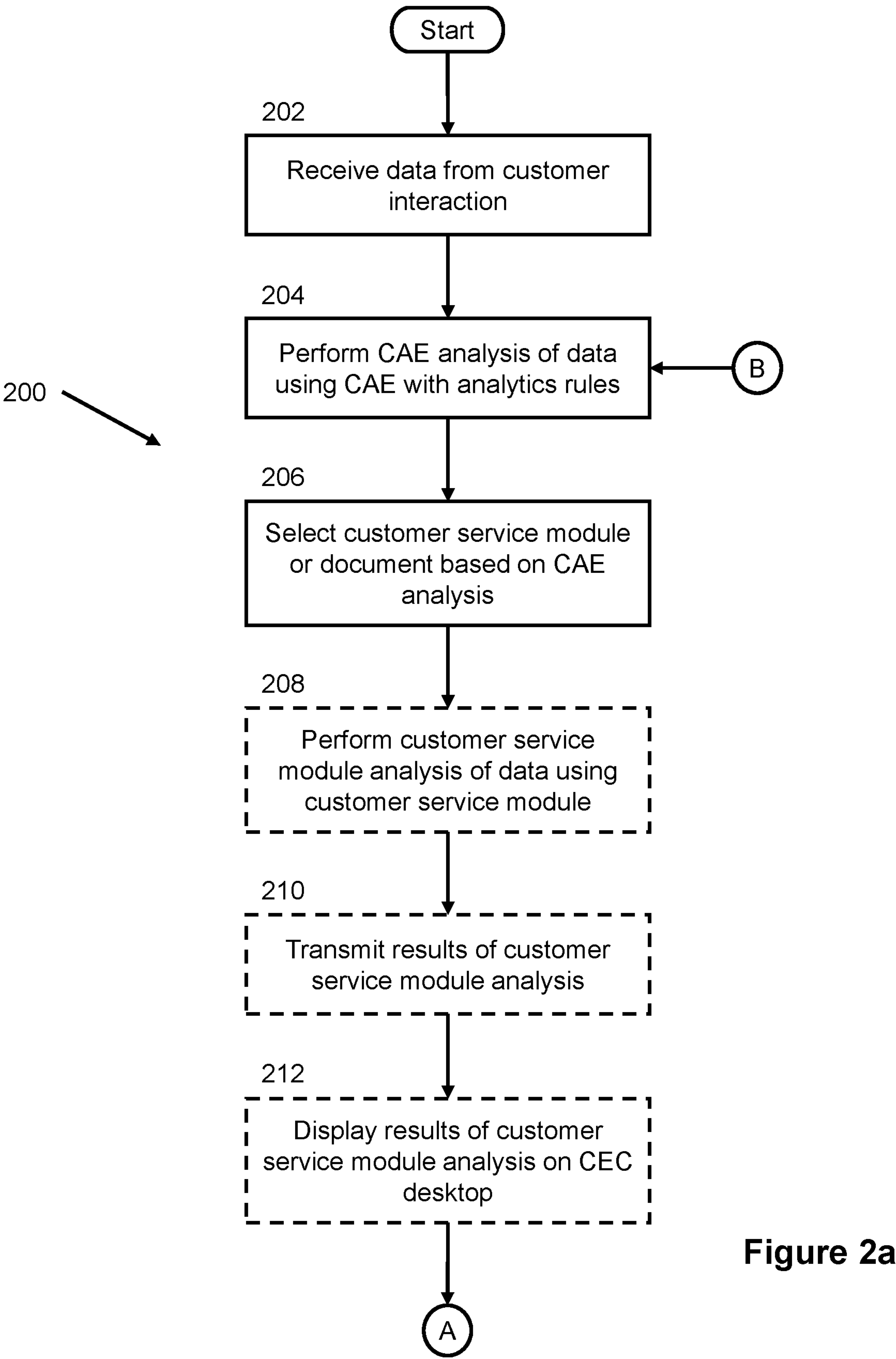
Figure 2B:
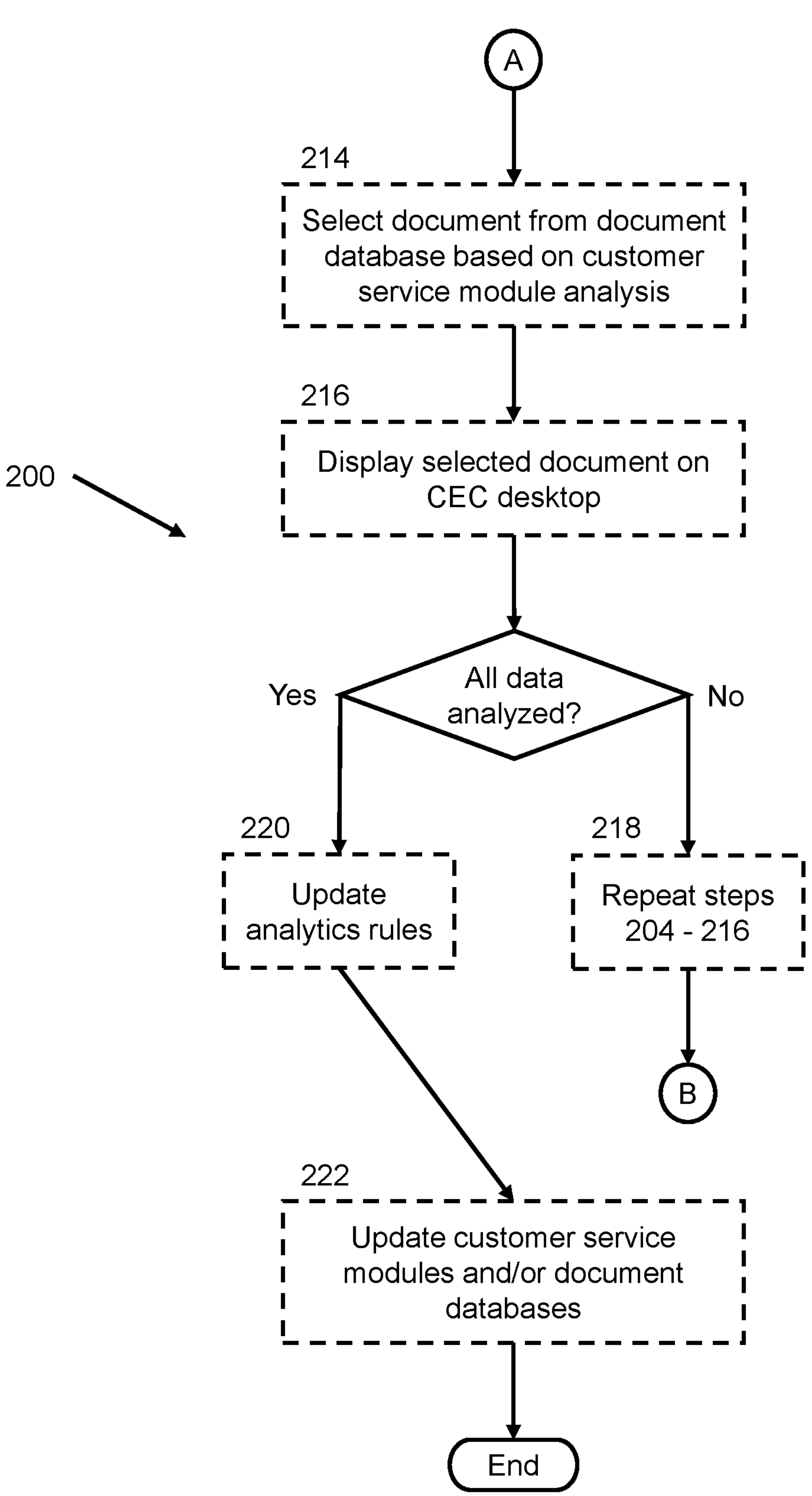

FIGS. 2*a* and 2*b* depict a flowchart of an exemplary embodiment of a method for organizing and integrating electronic customer service resources.

Figure 3:
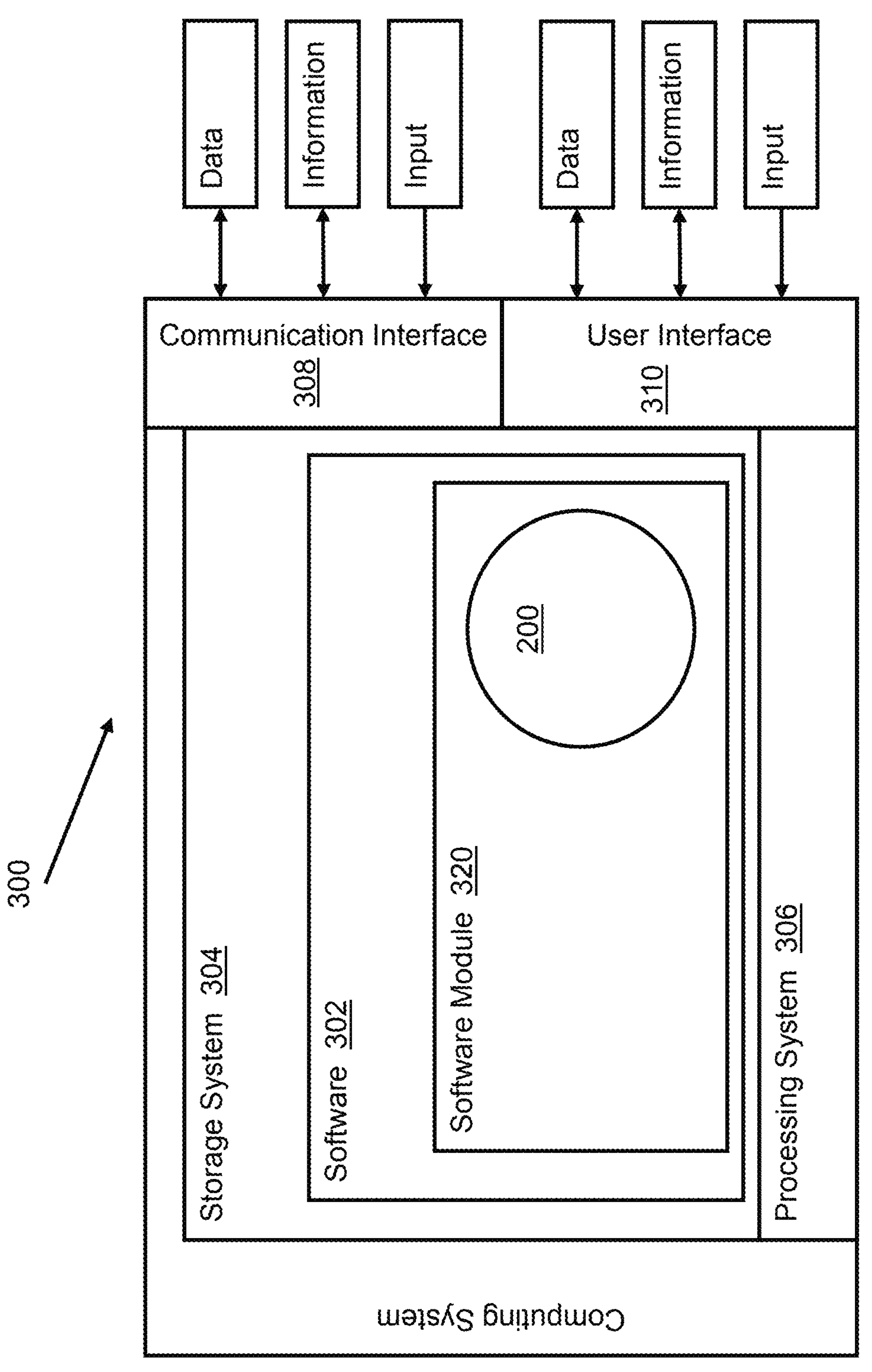

FIG. 3 depicts an exemplary embodiment of a system for organizing and integrating electronic customer service resources.

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms “means for” or “step for” are explicitly recited in the respective limitation.

CEC systems allow CSRs to engage with customers in a controlled manner. By providing organized and integrated computer-based customer service resources and tools to the CSR, the CEC system can allow an organization to achieve several key benefits. First, the system will ensure maximized use of the appropriate resources and tools with minimal CSR training. Second, the CEC system’s adaptive nature allows it to adjust to new protocols and individual CSR habits and preferences. Third, the CEC system’s interlinked and adaptive nature allows it to adjust to wide-scale organizational habits and preferences developed over time, and to provide accurate feedback for evaluation of the use of available resources. Fourth, the modular nature of the CEC system allows addition, update, and/or removal of customer service modules and document databases as needed.

In embodiments, it is desirable for the system to automatedly update analytics rules in a CAE used by the CEC system to analyze interaction data. This permits the system to adapt to use or non-use of a particular customer service module or document database. The system is able to analyze CSR desktop usage and the use of resources through an analysis of the CAE activity to determine CSR preferences and successful use of resources. In an embodiment, it is desirable to automatedly update the analytics rules based on analysis from either the CAE, another CAE, or a customer service module. In another embodiment, it is desirable to update the analytics rules based on input from a CEC desktop or a system input. In yet another embodiment, it is desirable to update the customer service modules and/or the document databases along similar lines.

FIG. 1 depicts an exemplary embodiment of CEC system 100 for organizing and integrating electronic customer service resources. CEC system 100 receives and utilizes data from at least one CSR, at least one external contact (by way of non-limiting example, a customer or potential customer), at least one internal contact (by way of non-limiting example, a supervisor or quality assurance (QA) specialist), and/or any combination thereof. CEC system 100 includes at least one CAE 110 connected to at least one customer service module 120 and/or document database 130, at least one CEC desktop 140, and at least one optional system input 150.

CAE 110 is configured to constantly receive and analyze data received by the CEC system 100. The data received by the CAE may include audio or textual data from a customer service interaction, including incoming data from the client or outgoing data from the customer service representative and/or supervisor. Further the data can include stored data relating to the customer and customer service history and preferences, stored data relating to the customer service agent, the customer service agent’s service history and preferences, data relating to similar customer service interactions and data relating to the use of customer service resources for the above data. All interactions, incoming or outgoing will also have interaction metadata associated that details information about the interaction, including, but not limited to, identification of the customer and/or customer service representative.

The Analysis may be a real-time analysis of streaming data or batch analysis of data. The type of analysis of the data will depend on the type of data received. Types of analysis may include text analysis, voice analysis, customer value analysis, customer survey/feedback analysis, and agent desktop use analysis. For example, if the interaction data received is audio data from a customer, the system may perform voice analytics to determine the customer’s current sentiment, the customers level of vocabulary, the preferred communication style, etc. If the interaction data received is a written message from a customer, the CAE may perform text analysis to determine the same things as determined by voice analysis. Further, if the interaction data received is audio data, the system may perform voice analysis on the audio data and may transcribe the audio data to a textual transcript and then conduct a text analysis on the textual transcript. Customer value analysis identifies the customer and correlates how the customer values previous activity taken in previous actions. Customer value analysis may also determine the level of value the customer has to the organization. Customer survey/feedback analysis may incorporate written surveys but may also include determination of client sentiment and correlate client sentiment with the actions taken and electronic resources used in those interactions.

Agent desktop use analysis is similar to the customer survey/feedback analysis; however, it is from the CSR point of view and uses desktop usage information in addition to agent sentiment to determine the success of electronic resources and actions taken in interactions. The desktop data usage includes information about what resources the CSR has used in the current interaction and in previous interactions. This data can be correlated with metadata relating to the interaction, such as interaction type, customer information, duration of interaction information. The desktop data usage may include, but is not limited to, the electronic resources that have already been used in the interaction and/or in other interaction the CSR has participated in, applications the CSR has accessed, the documents and pages the CSR has visited, whether the CSR has consulted with a colleague, how many clicks the CSR has made, etc. This allows the system to analyze the desktop usage data and determine how successful the use of the electronic resource was in the interaction and determine how successful the CSR’s use of electronic resources was in the interaction. For example, if during the current interaction, the CSR has clicked in the desktop more times that average for the CSR or has used more electronic resources than average, the system may determine that the actions the CSR has completed during the current interaction have not been successful, whereas a lower number of clicks or use of electronic resources may indicate to the system that the resources and actions by the CSR were highly successful in that interaction.

The above types of analysis are combined for each interaction and based on the data gathered from the interaction and/or previous interactions from the CSR or the system as a whole, and the system determines information about the current interaction such as, the type of interaction, the value level of the customer, the current sentiment of the customer, previous sentiment of the customer from prior customer service interactions or the most recent customer service interaction, whether the customer has called about the same problem or a similar problem, what was the customer’s sentiment in those interactions, etc. Based on the analysis of the system and application of the analytics rules

111, the system may determine the electronic resources that are most successful or most commonly used for different interactions.

Additionally, the analysis may predict the electronic resource that will have the best success for the interaction or the electronic resources that should not be used for the interaction. The system may use machine learning techniques to create models based on the analysis of the interaction comparison to already existing models and analysis of similar interactions and the degree of success of the electronic resource success for types of interactions. For example, if the analysis determines that every time a client says or types the phrase "appointment", the CSR opens the appointment scheduling electronic resource and completes an appointment, the system may create a model that indicates using the appointment scheduling electronic resource is a highly successful electronic resource to open when the client mentions "appointment." In another example, if the client interaction mentions "repair" and the CSR takes a long time to complete the interaction or accesses numerous different electronic resources prior to completing the interaction, the system may determine that the initial electronic resources accessed by the CSR were unsuccessful in assisting the client and may create a model indicating that those electronic resources may be less successful when "repair" is mentioned in an interaction. Models may be system wide, CSR specific, client specific, interaction type specific, problem type specific, and/or any combination.

The above models and/or analysis may be used to create or update analytics rules 111 for the CAE 110. CAE 110 includes at least one set of analytics rules 111 used to analyze data. Analytics rules 111 determine responses to information extracted from data for current interactions, governing which customer service modules 120 and/or document databases 130 are accessed by CAE 110, and what module functions and/or documents are utilized. Analytics rules 111 may be static or may be dynamically updated by CAE 110 analysis, customer service module 120 instructions, and/or a user or third party utilizing CEC desktop 140 or system input 150. Updates may be manual or automatic. Automatic updates to analytics rules 111 may be triggered by meeting certain criteria within analytics rules 111 of CAE 110 or within customer service modules 120, or may occur at predetermined intervals. Analytics rules 111 may be software programs or separate files executed by a software program. For example, the simplest set of analytics rules 111 may be manually input or initially manually input to be keyword based or action based. For example, the system may be told if an incoming interaction indicates "purchase," always open the catalog electronic resource for the CSR, which will allow the CSR to assist the client in completing a purchase. However, over time and analysis of incoming interactions, the system may determine that if the incoming interaction mentions both "purchase" and "receipt" that the client is not really calling to purchase something they are calling because they want to return a purchase. Therefore, based on the analysis, the system may update the analytics rules 111 to direct the system to always open the catalog electronic resource if "purchase" is indicated in the interaction, but not if "receipt" is also indicated in the interaction. Further, the system may create a new analytics rule 111 to open a returns script from one of the document data bases when "receipt" is indicated in the interaction.

Another example would be an initial analytic rule 111 that indicates when the interaction involves troubleshooting an issue with a mobile phone that the system should provide the CSR with a particular script or article from the document data base to assist with the interaction. However, if there has been a change to the operating system of the phone or the particular article is no longer applicable to the trouble shooting issue, over time, based on the accumulated analysis of the system, a model may be developed indicating that use of that article/script results in unfavorable customer sentiment or a model may be developed by the system indicating that use of a different (more current article/script) has a more positive result. If one of the models has a high rate of accurate prediction, then the analytics rules may be updated accordingly to reflect the new model. This result can occur through machine learning analytics that automatedly determines the decline in the use of the article over time or the lack of customer satisfaction when the article is used. In another embodiment, this could occur through customer and CSR feed back indicating to the system that the recommended electronic resource was unhelpful or was helpful and after time or quantity of "votes" the analytics rules 111 will be updated accordingly. The system may also include the ability for the customer/CSR to recommend an electronic resource they did find helpful. In another embodiment, the analytics rules may be updated manually after a review of the interaction analysis and prevailing models. It should be understood that these are merely examples of how the analysis creates recommended electronic resources and how the analytics rules can be applied to those recommendations. All of the above embodiments can be used alone or in combination. The above examples are simplistic single issue and single model application analytics rules 111. However, the analytics rules may be complex applying several models. For example, a complex analytics rule 111 may be contingent upon any number of factors analyzed by the system in the interaction data, such as, but not limited to, the interaction type/issue, the customer value, the customer feedback, and the customer sentiment and what electronic resource the models for those analytic results predict would yield a beneficial result. Below are three examples of different possible complex analysis rules 111 for the same interaction type/issue, but different other analytical results. An example complex rule may look like:

IF categorisation=<specific mobile phone issue>
AND customer value=mid-tier
AND sentiment=neutral
THEN provide current model article for troubleshooting specific issue from the resource database to CSR to send to customer.

However, if the system has received customer feedback indicating the customer was unhappy with the result of the above electronic resource suggestion, the system may have an alternate analytics rule 111 that provides the CSR with a script flow electronic resource for walking the customer through the trouble shooting step by step. The analytics rule for this complex example may look like:

IF categorisation=<specific mobile phone issue>
AND customer value=mid-tier
AND sentiment=neutral
AND most recent feedback score=NEGATIVE
THEN provide CSR with electronic resource that has a step by step scripted guide to identify and fix the issue.

However, if the customer of the interaction is a high value customer, the system may have an alternate analytics rule 111 that provides the CSR with an instruction from the resources data base to schedule an appointment or that automatedly brings up a scheduling electronic resource with the schedule of the nearest shop or last used shop for the customer. The analytics rule for this complex example may look like:

IF categorisation=<specific mobile phone issue>
AND customer value=high-tier
AND sentiment=angry or disappointed
THEN open scheduling electronic resource for nearest shop for customer so CSR can schedule a complimentary appointment with an expert at the nearest shop.

Accordingly, the models may be continually updated or batch updated based on the analysis of interactions and the updated models may cause the analytics rules to be updated to reflect models providing desired results for future interactions. The models and analytics rules 111 may be system wide, specific to a CSR or group of CRS, or specific to a customer or group of customers, or specific to interaction types or any combination.

While the exemplary embodiment includes two CAEs 110, CEC system 100 may include more CAEs 110 or only one CAE 110. In embodiments with multiple CAEs 110, CAEs 110 may be constantly connected, periodically connected, interconnected through at least one customer service module 120 and/or document database 130, or separate. In embodiments with a single CAE 110, CAE 110 is connected, directly or indirectly, to all customer service modules 120, document databases 130, CEC desktops 140, and/or system inputs 150.

The computerized customer service resources are applications/programs/documents that may be suggested and/or provided automatedly to the CSR during the interaction include customer service modules 120 and documents or scripts from document databases 130. Computerized customer service resources do not include routing services or customer interaction services (such as connecting a customer of text changes, text messaging, telephone, social media, etc.). These services are provided by different modules that are not discussed herein.

Customer service modules 120 may be connected to CAE 110, other customer service modules 120, document databases 130, and/or CEC desktops 140. In certain embodiments, some customer service modules 120 connect CAE 110 to certain other customer service modules 120 and/or document databases 130. Customer service modules 120 provide different customer service functionalities to CEC system 100. A single customer service module 120 may perform multiple processes, a single process, and/or part of a larger process. In embodiments with multiple CAEs 110, each CAE 110 may have its own set of customer service modules 120 or may share all or some specific customer service modules 120. Customer service modules 120 can be updated by adding, updating, or removing specific customer service modules 120. The connections between CAEs 110, customer service modules 120, document databases 130, and CEC desktops 140 may also be updated.

Customer service modules 120 are different applications/resources the CSR might use to assist in completing interactions. Customer service modules 120 might automatedly aid the CSR in future interactions related to the current interaction (e.g. scheduling a call back, sending a transcript, or sending a document), business specific processes related to the current interaction (e.g. change of address, restoring access to a service, renewing a card, checking on an order), and providing key product features/functions related to the current interaction (e.g. placing an order, providing the CSR with data pertaining to the interaction, adding information to customer record). These are merely examples of customer service modules 120 and should not be considered limiting. Customer service modules 120 are only resources to aid the CSR in completing interactions. Customer service modules 120 do not include routing services, which are separate from customer service modules 120. The routing of customers to CSRs is performed by modules not discussed herein.

By way of non-limiting example, customer service modules 120 may perform voice and text analytics, QA analytics, analytics relating to usage of CEC desktop 140 or other available resources, and any other analysis related to a CSR's activities during customer service interactions. Customer service modules 120 may provide the results of such analyses to CAE 110 or to other customer service modules 120. By way of further non-limiting example, customer service modules 120 may also retrieve information for the CSR, such as customer profiles and history internal customer service documentation, and any other customer service information. By way of further non-limiting example, customer service modules 120 may also interact with the functions of CEC desktop 140. Such interactions may allow another CEC desktop 140 to observe and/or share another CEC desktop 140, and utilize, update, or transmit or retrieve information to or from certain functions of the CEC desktop 140.

Document databases 130 are connected to CAE 110 and may be connected to other document databases 130 and/or customer service modules 120. Document databases 130 store documents for use by CEC system 100. Documents can be broken down into several types of textual information, including scripts/templates for communication, documents to be provided to customers, and data. The scripts/templates include specific textual scripts to be spoken by the CSR and step-by-step instructions provided to the CSR. Document to be provided to customers include information that can be delivered directly to the customer (through text, email, in person, etc.). By way of non-limiting example, document databases 130 may store customer profiles and history, scripts or templates for communication, help screens, forms, internal customer service documentation, routing logs, analysis results, and any other customer service information. Documents stored in document databases 130 may be categorized by type, matter, applicable process, or any other possible classification schema. Document databases 130 and the information contained therein can be updated by adding or removing information to documents in document database(s) 130, adding or removing entire documents to or from document database(s) 130, or adding or removing entire specific document database(s) 130. The connections between CAEs 110, customer service modules 120, and document databases 130 may also be updated.

CEC desktop 140 receives and displays documents from document databases 130 and the results of any analyses from customer service modules 120, if applicable, as relayed by CAE 110. Processes from customer service modules 120 may also interact with the processes of CEC desktop 140. By way of non-limiting example, if a customer service module 120 determines that a CSR on a phone call frequently manually opens a note-taking function on CEC desktop 140, customer service module 120 may automatically open that function when a phone call comes in. Optionally, CEC desktop 140 may also be used to modify analytics rules 111 or submit a request to CAE 110.

System input 150 allows a user to update analytics rules 111. This allows a supervisor, system administrator, or other third party to make changes precisely to analytics rules 111, as opposed to updates which may be caused by usage or made through CEC desktop 140. System input 150 connects to at least one CAE 110.

By way of non-limiting example of the functioning of CEC system 100, if a CSR verbally schedules a follow-up call with a customer, CAE 110 may direct a voice-recognition customer service module 120 to perform voice recognition to determine the date and time for follow-up. Another customer service module 120 utilizes this information to update a calendaring process on CEC desktop 140 with the information. A third customer service module 120 retrieves the customer's contact information from document database 130 for CAE 110 to display on CEC desktop 140 at the scheduled call time. During the call, a fourth customer service module 120 responds to a query received from CEC desktop 140 through CAE 110 by retrieving a specific follow-up script document from document database 130 and displaying it on CEC desktop 140. If, over time, the CSR frequently schedules follow-up calls, CAE 110 may update the analytics rules 111 to automatically connect to an advanced calendaring customer service module 120 during every call. If the CSR stops scheduling follow-up calls, CAE 110 may again update the analytics rules 111 to stop automatically connecting to the advanced calendaring customer service module 120.

FIGS. 2*a* and 2*b* depict a flowchart of an exemplary embodiment of method 200 for organizing and integrating electronic customer service resources using a CEC system.

In step 202, the CEC system receives data from a customer interaction. Such interactions may be multi-sided, such as, but not limited to, a three-way telephone call or an instant message exchange between a CSR and a customer, or one-sided, such as, but not limited to, an email composed by a CSR and addressed to a customer.

In step 204, the CEC system performs CAE analysis of the data using a CAE incorporating a set of analytics rules.

In step 206, the CAE selects at least one customer service module or at least one document from at least one document database based on the CAE analysis of step 204.

In optional step 208, the selected customer service module performs a customer service module analysis of the data. The type of analysis performed by the customer service module will depend on the customer service module automatedly used to assist the CSR. As a nonlimiting example, if the customer service module is a scheduling module, the module may analyze the interaction data to determine the CSR handling the interaction and automatedly open that CSR's calendar or suggest a date to the CSR where the CSR is available. Further, module may analyze the interaction data to determine the identify of the customer, access the customer's stored data and suggest a date to the CSR based on the customer's indicated preferred call back times or based on an analysis of the customer's previous call times. Further, the module may perform a text or audio analysis of the interaction and determine a specific date and time the customer would like to schedule. If the module determines that the CSR is available at the specific date and time requested, the module may automatedly schedule the appointment. It should be understood that the above may be accomplished by a single module or by several modules. As another nonlimiting example, if the customer service module is a ordering module, the module may receive the interaction data and perform a voice or text analysis of the data to determine the type of product the customer would like to order. The module may then present to the CSR all available options for purchase of that product type. The customer service module has access to all system data including, the interaction, the interaction analysis, and historic system data. The system will pass the information required by the customer service module to the customer service module for analysis and processing. The CSR may have already received (or will soon receive) the interaction from the customer through whatever medium the customer is using to communicate with the CSR.

In optional step 210, the customer service module transmits the results of the customer service module analysis performed in step 208 to the CAE, another customer service module, or the CEC desktop.

In optional step 212, the CAE displays the results of the customer service module analysis performed in step 208 on the CEC desktop.

In optional step 214, the customer service module selects a document from a document database based on the customer service module analysis performed in step 208.

In optional step 216, the CAE displays the selected document on the CEC desktop.

In optional step 218, the CEC system repeats steps 204 through 216, as required, until all data received by the CEC system has been analyzed.

In optional step 220, the CEC system updates the analytics rules based on the CAE analysis from the CAE, another CAE analysis from another CAE, or a customer service module analysis, or based on input from a CEC desktop or a system input.

In optional step 222, the CEC system updates the customer service modules and/or the document databases based on the CAE analysis from the CAE, another CAE analysis from another CAE, or a customer service module analysis, or based on input from a CEC desktop or a system input.

FIG. 3 depicts an exemplary embodiment of system 300 for organizing and integrating electronic customer service resources using a CEC system.

System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Computing system 300 includes a software module 320 for performing the function of CEC system 100. Although computing system 300 as depicted in FIG. 3 includes one software module 320 in the present example, it should be understood that more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other information. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

As described in further detail herein, computing system 300 receives and transmits data through communication interface 308. The data can include verbal or textual communications to or from a customer and details about a request, a work order, or another set of information that will necessitate an interaction between a customer and the CSR. In embodiments, the communication interface 308 also operates to send and/or receive information, such as, but not limited to, information to/from other modules, devices, and/or systems to which computing system 300 is communicatively connected, and to receive and process system input, as described in greater detail above. Such information can include transmissions between CAE 110 and another CAE 110, customer service module 120, and/or document database 130, documents from document database 130, information about a CSR's use of CEC system 100, and results of analyses performed by CAE 110 or customer service module 120.

User interface 310 can include one or more CEC desktops 140, one or more system inputs 150, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display documents, CEC desktop 140, or another interface further associated with embodiments of the system and method as disclosed herein. Speakers, printers, haptic devices and other types of output devices may also be included in the user interface 310. A CSR or other staff can communicate with computing system 300 through the user interface 310 in order to view documents, enter or receive data or information, enter system input, manage an interaction, or any number of other tasks the CSR or other staff may want to complete with computing system 300.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for machine learning to generate analytics rules for predicting one or more computerized resource modules for use in completing an interaction, comprising:

receiving a plurality of historic interactions and interaction metadata as interaction data structures, each interaction data structure including a plurality of fields, including an interaction data field, an internal contact data field, customer identification data fields, and a representative electronic resource data field listing computerized resource modules used by a customer service representative associated with the internal contact data field for a historic interaction;

performing agent desktop use analytics and text analytics or voice analytics on each interaction data structure, wherein the agent desktop use analytics include monitoring use of agent desktops, and receiving a set of data pertaining to use of agent desktops associated with each interaction data structure of the interaction data structures;

generating a customer sentiment based on the agent desktop use analytics, at least one of the plurality of fields in an interaction data structure, and the text analytics or voice analytics;

generating a success indicator for each computerized resource module included in the representative electronic resource data field based on the customer sentiment, the agent desktop use analytics, at least one of the plurality of fields in the interaction data structure, and the text analytics or voice analysis, wherein the success indicator includes a degree of success associated with using a computerized resource module for the corresponding interaction data structure;

generating at least one model configured to create at least one analytics rule using machine learning techniques based on the interaction data structures, generated customer sentiment, and generated success indicator, wherein the at least one analytics rule causes at least one of a plurality of computerized resource modules to be selected to be accessed by a central analytics engine in connection with receipt of a new interaction, further wherein the plurality of computerized resource modules are computerized applications;

using the at least one model to create at least one analytics rule, wherein the at least one analytics rule is a complex analytics rule corresponding to at least two of the following: a customer tier value, a customer sentiment, a customer feedback score, a type of interaction, a computerized resource module rating, or a set of keywords, and wherein a category of the complex analytics rule indicates a mobile phone issue for a given customer tier value and a given customer sentiment value, and in response, the complex analytics rule indicates to provide a model article for troubleshooting the mobile phone issue from a resource database of the at least one model to the customer service representative;

monitoring for new interactions data structures and automatically continually updating the at least one model when a new interaction data structure is received based on analysis of interaction data structures such that the at least one model includes the new interaction data structure when creating analytics rules; and using the updated at least one model to create at least one new analytics rule.

2. The method of claim 1, further comprising performing customer value analytics on each interaction data structure and generating a customer value level.

3. The method of claim 2, wherein the customer value level is also used in generating the at least one model.

4. The method of claim 1, further comprising receiving a new interaction data structure and using the at least one model with the new interaction data structure to predict at least one analytics rule to apply to the new interaction data structure.

5. The method of claim 1, wherein the at least one analytics rule is a complex analytics rule corresponding to at least one of the plurality of fields and at least one of the customer sentiment or the success indicator.

6. The method of claim 1, wherein the plurality of computerized resource modules include voice analytic applications, text analytic applications, quality assurance applications, and scheduling applications.

7. A method for completing a real-time interaction using machine learning to predict analytics rules for the real-time interaction, comprising:

receiving a real-time interaction and associated interaction metadata in real-time;

populating a real-time interaction data structure with the real-time interaction and associated interaction metadata, where the real-time interaction data structure includes a plurality of fields, including an interaction data field, an internal contact data field, and customer identification data fields;

performing text analytics or voice analytics on the real-time interaction data structure;

generating a customer sentiment based on at least one of the plurality of fields in the real-time interaction data structure and the text analytics or voice analytics;

inputting the real-time interaction data structure and generated customer sentiment into a trained model to predict at least one analytics rule to be applied to the real-time interaction, wherein:

the at least one analytics rule identifies one or more computerized resource modules of a plurality of computerized resource modules to automatedly execute in real-time while completing the real-time interaction, further wherein the plurality of computerized resource modules are computerized applications, the at least one analytics rule is a complex analytics rule corresponding to at least two of the following: a customer tier value, a customer sentiment, a customer feedback score, a type of interaction, a computerized resource module rating, or a set of keywords, and a category of the complex analytics rule indicates a mobile phone issue for a given customer tier value, a given customer sentiment, and a negative customer feedback score, and in response, the complex analytics rule indicates to provide a customer service representative with an electronic resource to identify and fix the mobile phone issue;

applying the at least one analytics rule predicted by the trained model to the real-time interaction data structure and the generated customer sentiment;

executing, by a central analytics engine, in real-time, the one or more computerized resource modules identified by the at least one analytics rule to complete the real-time interaction;

generating a success indicator for each computerized resource module used to complete the real-time interaction, wherein the success indicator includes a degree of success associated with using a computerized resource module for the corresponding real-time interaction data structure;

monitoring for the real-time interaction and automatically continually updating at least one model when the real-time interaction data structure is received based on analysis of the real-time interaction data structure such that the at least one model includes the real-time interaction data structure to create analytics rules; and using the updated at least one model to create at least one new analytics rule.

8. The method of claim 7, further comprising performing customer value analytics on the real-time interaction data structure and generating a customer value level.

9. The method of claim 8, wherein the customer value level is also input into the trained model and used by the trained model to predict at least one of a plurality of analytics rules to be applied to the real-time interaction.

10. The method of claim 7, further comprising including agent desktop analytics and the one or more computerized resource modules run for the real-time interaction in the fields of the real-time interaction data structure in a representative electronic resource data field.

11. The method of claim 10, wherein the success indicator is based on and the customer sentiment, the agent desktop analytics, and fields in the real-time interaction data structure.

12. The method of claim 7, further comprising using the updated at least one model on a new real-time interaction to predict at least one analytics rule including the new analytics rule to apply to the new real-time interaction.

13. The method of claim 7, further comprising using the updated at least one model to update the at least one analytics rule.

14. A system for machine learning to generate analytics rules for predicting one or more computerized resource modules for use in completing an interaction, comprising:

a memory comprising computer readable instructions;

a processor configured to read the computer readable instructions that when executed causes the system to:

receive a plurality of historic interactions and interaction metadata as interaction data structures, each interaction data structure including a plurality of fields, including an interaction data field, an internal contact data field, customer identification data fields, and a representative electronic resource data field listing computerized resource modules used by a customer service representative associated with the internal contact data field for a historic interaction;

perform agent desktop use analytics and text analytics or voice analytics on each interaction data structure, wherein the agent desktop use analytics include monitoring use of agent desktops, and receiving a set of data pertaining to use of agent desktops associated with each interaction data structure of the interaction data structures;

generate a customer sentiment based on the agent desktop use analytics, at least one of the plurality of fields in an interaction data structure, and the text analytics or voice analytics;

generate a success indicator for each computerized resource module included in the representative electronic resource data field based on the customer sentiment, the agent desktop use analytics, at least one of the plurality of fields in the interaction data structure, and voice analytics or text analytics, wherein the success indicator includes a degree of success associated with using a computerized resource module for the corresponding interaction data structure;

generate at least one model configured to create at least one analytics rule using machine learning techniques based on the interaction data structures, generated customer sentiment, and generated success indicator, wherein the at least one analytics rule causes at least one of a plurality of computerized resource modules to be selected to be accessed by a central analytics engine in connection with receipt of a new interaction, further wherein the plurality of computerized resource modules are computerized applications;

use the at least one model to create at least one analytics rule, wherein the at least one analytics rule is a complex analytics rule corresponding to at least two of the following: a customer tier value, a customer sentiment, a customer feedback score, a type of interaction, a computerized resource module rating, or a set of keywords, and wherein a category of the complex analytics rule indicates a mobile phone issue for a high-tier customer tier value and an unfavorable customer sentiment, and in response, the complex analytics rule indicates to provide an open scheduling electronic resource for a nearest shop for scheduling of an appointment;

monitor the system for new interaction data structures and automatedly continually updating the at least one model when a new interaction data structure is received based on analysis of interaction data structures such that the at least one model includes the new interaction data structure when creating analytics rules; and use the updated at least one model to create at least one new analytics rule.

15. The system of claim 14, wherein the processor is further configured to perform customer value analytics on each interaction data structure and generating a customer value level.

16. The system of claim 14, wherein the at least one analytics rule is a complex analytics rule corresponding to at least one of the interaction data field and at least one of the customer sentiment or the success indicator.

* * * * *